United States Patent [19]

Hand et al.

[11] 3,868,351

[45] Feb. 25, 1975

[54] SOLUTION PROCESS FOR THE PREPARATION OF POLYIMDIES FROM DIAMINES AND ANHYDRIDES

[75] Inventors: John D. Hand; Wendell G. Whitehouse, both of Pittsfield, Mass.

[73] Assignee: General Electric Company, Schenectady, N.Y.

[22] Filed: Sept. 13, 1972

[21] Appl. No.: 288,631

Related U.S. Application Data

[63] Continuation of Ser. No. 94,529, Dec. 2, 1970, abandoned.

[52] U.S. Cl... 260/78 UA, 117/126 GB, 117/143 A, 161/227, 260/37 N, 260/42 R, 260/42.18, 260/47 CZ, 260/47 UA
[51] Int. Cl............................................ C08g 20/20
[58] Field of Search....... 260/78 UA, 47 UA, 47 CZ

[56] References Cited
UNITED STATES PATENTS

| | | | |
|---|---|---|---|
| 2,306,918 | 12/1942 | Weiss et al. | 260/78 UA |
| 2,818,405 | 12/1957 | Kovacic | 260/78 UA |
| 3,562,223 | 2/1971 | Bargain et al. | 260/78 UA |
| 3,658,764 | 4/1972 | Bargain et al. | 260/78 UA |
| 3,669,930 | 6/1972 | Asahara et al. | 260/78 UA |
| 3,678,015 | 7/1972 | Holub et al. | 260/78 UA |
| 3,732,188 | 5/1973 | Holub et al. | 260/78 UA |
| 3,732,189 | 5/1973 | Crivello et al. | 260/78 UA |
| 3,740,378 | 6/1973 | Crivello | 260/78 UA |

*Primary Examiner*—Harold D. Anderson

[57] ABSTRACT

Novel polyimide prepolymers with improved mold flow characteristics and enhanced physical properties when thermoset, are provided by heating a difunctional amine and an anhydride of an unsaturated dicarboxylic acid in a solvent at a temperature not in excess of 75°C. until all of the amine groups are reacted, then, without isolating the reaction product, heating it with more difunctional amine in a solvent at a temperature not in excess of 75°C. until formation of a prepolymer is substantially complete.

12 Claims, No Drawings

SOLUTION PROCESS FOR THE PREPARATION OF POLYIMDIES FROM DIAMINES AND ANHYDRIDES

This is a continuation of application Ser. No. 94,529, filed Dec. 2, 1970, now abandoned.

This invention relates to a process for the preparation of polyimide macromolecular in solution. The prepolymers rapidly cure with heat to provide marcromolecular polyimides with valuable mechanical and electrical properties and high thermal stability.

BACKGROUND OF THE INVENTION

It is known, for example, from the disclosure in French Pat. No. 1,555,564, that the reaction of difunctional amines with at least one equimolar amount of a difunctional imide of an unsaturated dicarboxylic acid provides so-called polyimide prepolymers. The prepolymers, on further heating, produce a family of macromolecular polyimides with outstanding resistance to heat and solvents and with high mechanical strength and excellent electrical properties.

Such prepolymers are disclosed to be formed by reacting a difunctional amine of the general formula:

wherein R is a divalent group having up to about 30 carbon atoms with a difunctional imide of the general formula

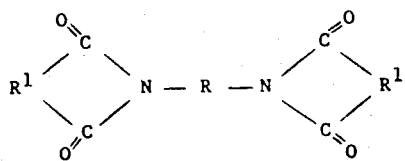

wherein $R^1$ is a divalent group containing up to about 30 carbon atoms and having at least one carbon-to-carbon double bond. R and $R^1$ can be the same or different.

It is believed that the predominant reaction in the formation of such pre-polymers is the addition of the elements of an amine group across the double bond in $R^1$. However, a second type of reaction is also known to occur, that is, vinyl addition polymerization between the unsaturated carbon-to-carbon linkages in the groups designated $R^1$ in the above formula.

It is further known that the reaction between the difunctional amine and the difunctional imide may be carried out either in bulk or in an inert polar carrier medium. In the bulk process, apparently because reactivity is low unless the mixture is melted, it is necessary to heat the reaction mixture to an elevated temperature, of the order of 100° to 200°C., to induce any reaction at all between the two reagents. In most cases at least about 120°C. is used and it is reported to be preferred to heat at about 160°C. if the reaction is to be completed in a reasonable time. If an inert polar carrier medium is to be used it is suggested to employ dimethylformamide (b.p. 153°C.), N-methylpyrrolidone (b.p. 202°C.) and dimethylacetamide (b.p. 163°–165°C.). If dimethylformamide is used as a carrier it is specifically recommended to heat the solution at 150°C., i.e., near the reflux temperature. Thus the reaction, even in a polar carrier medium, is reported to proceed at a temperature from the middle to the upper range of temperature necessary to the bulk process.

Although the advantages are self-evident, there have not been proposed any successful processes to prepare such prepolymers by directly reacting a diamine with an anhydride of an unsaturated dicarboxylic acid. It has always been the practice to prepare a difunctional imide first and then to isolate it, further purify it, and finally to react the dry, pure imide with more amine.

It is known that production of the imide by reaction of a diamine with an anhydride is accompanied by the formation of various, and often substantial, quantities of side reaction products. Conventionally these are removed by precipitation of the imide and other separation techniques and the imide is isolated and dried before being reacted with more diamine. It has been thought to be essential to purify the imide in order to obtain uniformity in the prepolymers.

It has now been found, however, that with careful attention to reactant ratios, the use of reaction temperatures below those suggested in the prior art, and if the process is carried out in a solvent, the polyimide prepolymers can be obtained by directly reacting a diamine and an anhydride.

Even though during the process the imide and side reaction products are produced, it is not necessary to separate the imide from the side products. Instead, all of the products are surprisingly further reactable with the amine, in situ, to form a novel polyimide resin.

As will be seen, with appropriate starting materials, overall yields of greater than 95% can be obtained. In contrast, in processes where the imide is isolated, yields are usually only about 80%, both based on raw materials, because about 15% or more of the raw materials are lost to side products.

The novel polyimide resins, obtained from mixtures containing the side products, have been found to be different from those that are made from purified, isolated and dried imide. Contrary to what would be expected, they tend to be substantially more thermally stable than those prepared by the prior art bulk or solvent techniques outlined above.

It is, therefore, a primary object of this invention to provide polyamide prepolymers directly by reacting a difunctional amine and an anhydride of an unsaturated dicarboxylic acid.

The present invention also has as a primary object the provision of a process to provide novel and improved polyimides.

Still another object of this invention is to provide polyimide prepolymers by a process that is economical and safe.

A further object of this invention is to provide polyimide prepolymers which can be thermally converted to macromolecular polyimides with better flow, molding and physical properties than those made by prior art bulk processes.

DESCRIPTION OF THE INVENTION

The above objects and advantages and others that will be apparent to those skilled in the art are secured according to this invention by (a) dissolving a difunctional amine and an anhydride of an unsaturated dicarboxylic acid in an inert solvent to form a solution containing from about 2 to about 3 moles of anhydride for each mole of amine; (b) heating the solution at a temperature not in excess of about 75°C. to form a condensation product in which the amine groups have been substantially completely reacted; (c) adding a difunctional amine to the reaction mixture from step (b) to provide a solution containing from about 2 to about 3 moles of condensation product for each mole of amine; and (d) heating the solution of step (c) at a temperature not in excess of about 75°C. until formation of said prepolymer is substantially complete.

The product of the process, a novel thermoset polyimide prepolymer, is provided after a direct conversion, in situ, and there is surprisingly no need to isolate (precipitate) a difunctional maleimido intermediate.

A preferred feature of the present process is to carry out step (b) in the presence of a catalyst for imidization, such as an acid or a salt of an acid, e.g., nickel acetate, an amine, such as triethyl amine, and a dehydrating agent such as an acid anhydride, e.g., acetic anhydride, or a mixture of any of the foregoing. In this embodiment, when a dehydrating agent is used, such as acetic anhydride, water is added to react with the excess to avoid possible anhydride-amine competing reactions, before step (c) is carried out. Following treatment of excess acetic anhydride with water a further advantage is achieved because the acid formed is an efficient catalyst for the reaction in step (d).

The process of this invention will be more easily understood by reference to the following reaction scheme. As will become clear from the further disclosure, many other starting materials can be used. Maleic anhydride and methylene dianiline and the use of an acetic anhydride catalyst are merely illustrative:

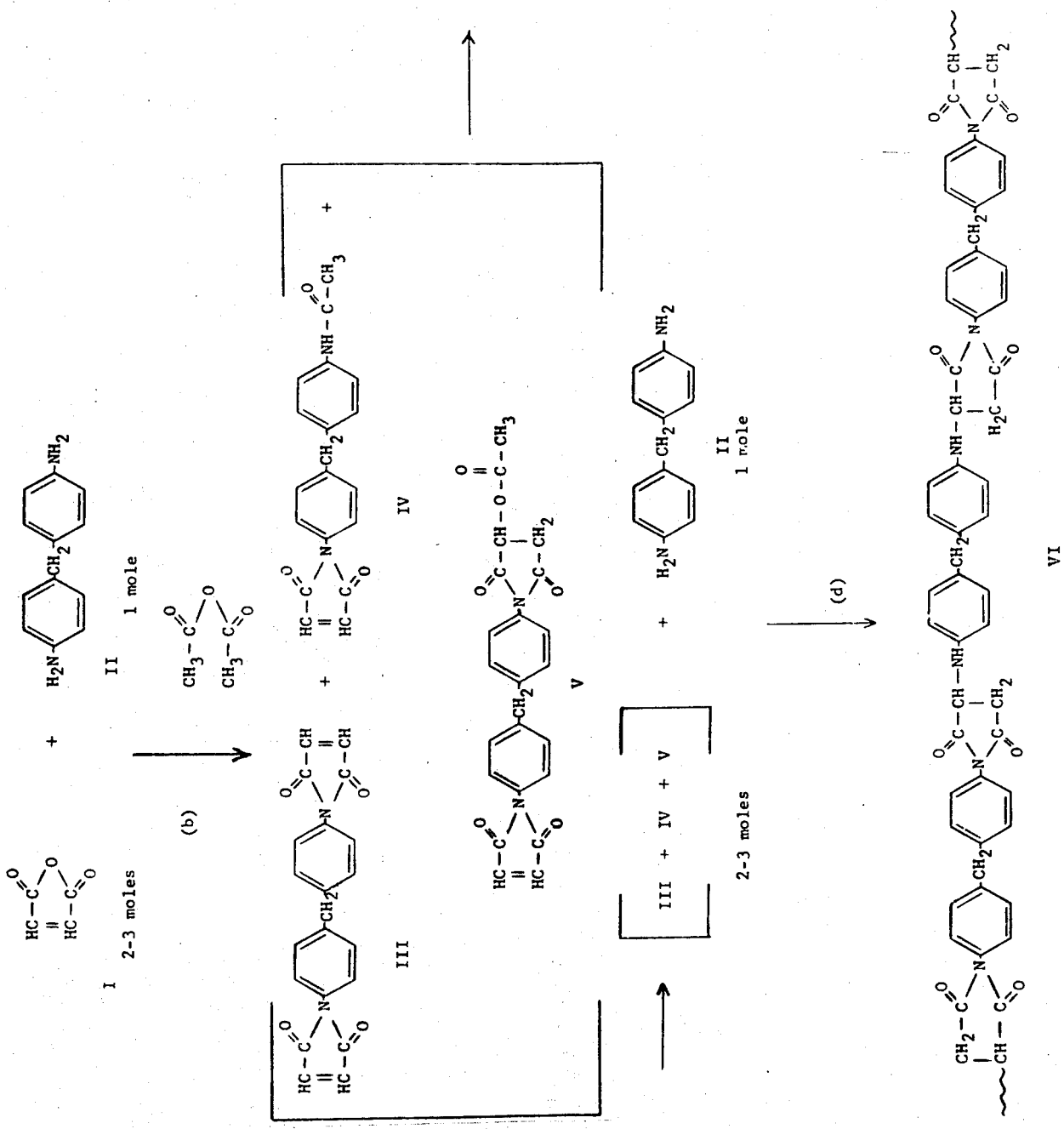

wherein I is maleic anhydride and II is methylene dianiline and (b) and (d) correspond to the process steps recited above. The reaction product of I and II in the presence of acetic anhydride comprises bis-maleimidodiphenylmethane (III), maleimido-4-acetamido-4'-diphenylmethane (IV) and maleimido-4-(α-acetoxysuccinimido)-4'-diphenylmethane (V). It is to be noted that all of the amine groups have been completely reacted. It is postulated that step (b) proceeds through an intermediate known as bis maleamic acid (not shown). In this compound, a condensation product too, all of the amine groups have been reacted. The ratio of III to IV to V will vary depending on the reaction conditions but usually III will predominate. Under most conditions the mixture of the bis imide and side products will contain about 85% of III, the balance being IV and V, usually about 10% of IV and 5% of V. The compound designated VI represents the predominant polyimide prepolymer, before cross-linking. The wavy groups at the ends are linked to other difunctional groups derived from difunctional III and also from IV and V which, although monofunctional, are polymerizable and, because of their relatively low concentration and monofunctionality usually enter VI as terminal groups.

It is regarded as critical to achieving the desired results that the reactants be heated in solution but that the temperature of such heating be no higher than about 75°C. If heating is carried out at a temperature even slightly above this, e.g., at 80° to 100°C., or especially in the range suggested in the prior art, 100°–200°C., the yield of reaction product will be very low and the ultimate prepolymer have poor flow and less than optimum properties.

In general, a solvent will be selected which provides a high percent solids content, e.g., from about 20 to about 65% by weight, and it is important to select a solvent which is inert to the components of the reaction mixture. Although it is not critical, it is desirable to employ a solvent which is partially or completely water miscible. It is useful to employ an inert organic polar solvent because the reactants and products are relatively polar in nature. In general, the solvents most useful in the present process will contain carbon, hydrogen and oxygen and will have up to about 8 carbon atoms, and a boiling point of from about 50°C. to about 200°C. A preferred family of solvents contain the bivalent ketone group —CO—. Although the compounds may contain an aromatic group, i.e., a phenyl group, they preferably contain only aliphatic groups, straight chain, branched or cyclic, of from about one to about six carbon atoms, the maximum total number of carbon atoms in the preferred compounds being about eight, including that in the ketone group. Especially preferred inert solvents are (lower)aliphatic ketones of the paraffinic or cycloparaffinic series, having the same or different radicals of from 2 to 8 carbon atoms attached to the ketone group, e.g., acetone, methylethyl ketone, diethyl ketone, methyl n-propyl ketone, ethyl n-propyl ketone, methyl n-butyl ketone, methyl i-butyl ketone, methyl t-butyl ketone, ethyl n-pentyl ketone, cyclopentanone, cyclohexanone, and the like.

Acetone is the most useful inert solvent for the present reaction and is preferred because it has been found to possess a surprising ability to cooperate with the diamine reactant and enhance the solubility of the condensation product. It has been found that the higher the solids content of the reaction mixture, particularly in step (d), the better the prepolymer will be in terms of uniformity and ultimate physical properties. In addition, the refluxing temperature of a solution of the reactants in acetone, about 62°C., is well below the maximum limit, 75°C., for the process advantages provided by this invention and therefore acetone lends itself to commercial operation on a large scale because the temperature can be easily controlled at the desired level. Acetone is also preferred because it is inexpensive, safe, nontoxic, water miscible, easily recovered (because of its low boiling point) and easily removed from the polymer (as in drying).

The difunctional amines used in the process of the present invention will be, for example, of the formula:
$H_2N—R—NH_2$
wherein R is a divalent group having up to about 30 carbon atoms and, optionally, oxygen, phosphorus, silicon, nitrogen and similar inert groups. Illustratively, and preferably, R can be straight or branched chain alkylene of up to 12 carbon atoms; cycloalkylene of 5 to 6 carbon atoms; a heterocyclic group of from 4 to 5 carbon atoms having at least one oxygen, nitrogen or sulfur atom in the group; a mono- or di-carbocyclic aromatic group, e.g., phenylene or naphthylene, or at least two such mono- or di-carbocyclic aromatic, i.e., arylene, or cycloalkylene groups joined by a direct carbon-to-carbon bond or joined through a divalent group, e.g., oxygen, sulfur, alkylene of from one to 3 carbon atoms or groups such as $—N=N—$; $—N(\rightarrow O)=N—$; $—NR^2—$; $—P(O)R^3—$; $—CO—O—$; $—SO_2—$; $—SiR^2R^3—$; $—CONH—$; $—R^4N—CO—R^5—OC—NR^4—$; $—O—CO—R^5—OC—O—$;

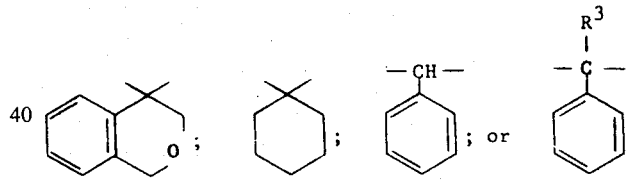

wherein $R^2$, $R^3$ and $R^4$ are alkyl, e.g., from 1 to 6 carbon atoms; cycloalkyl of from 5 to 6 carbon atoms, or mono- or di-carbocyclic aryl; and $R^5$ is divalent alkyl of up to about 12 carbon atoms, or mono- or di-carbocyclic arylene. The following groups are further illustrative of $R^1$: 4,4'-dicyclohexylenemethane, 1,4-cyclohexylene, 2,6-pyridyl, m-phenylene, p-phenylene, 4,4'-diphenylenemethane, 4,4'-diphenylene-2,2-propane; 4,4'-bi-phenylene, 4,4'-diphenylene oxide, 4,4'-diphenylene sulfide, 4,4'-diphenylene sulfone; 4,4'-diphenylene diphenyl silane; 4,4'-diphenylene methyl phosphine oxide; 3,3'-diphenylene methyl phosphine oxide; 4,4'-diphenylene phenyl phosphine oxide; 4,4'-diphenylene phenylamine; 1,5-naphthylene, m-xylylene; p-xylylene; ethylene; hexamethylene; and the like. Although all of the above may be used, it is preferred to use as the difunctional amine, the compound known as methylene dianiline, i.e., a compound of the formula

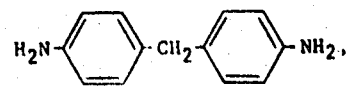

because the resins derived from this compound have a preferred combination of properties.

The anhydrides of unsaturated dicarboxylic acids used in the process of the present invention will be, in general, of the formula

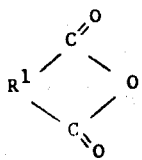

where $R^1$ is a divalent group containing up to about 30 carbon atoms, and optionally, oxygen, phosphorus, silicon, nitrogen and similar inert groups, and having at least one carbon-to-carbon double bond. The anhydrides can be, for example, derived from maleic and substituted, e.g., alkyl of up to 6 carbons, aryl or halogen substituted maleic acid; or derived from citraconic or itaconic acid, from tetrahydrophthalic acid and similar Diels Alder condensation products of a diene with one of these anhydrides of an unsaturated acid, as well as all such products substituted, for example, with alkyl of up to 6 carbon atoms, aryl, e.g., phenyl or halogen, e.g., fluorine, chlorine, bromine and iodine. Illustratively and preferably, $R^1$ can be

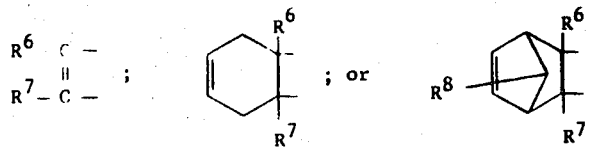

wherein $R^6$, $R^7$ and $R^8$ are independently hydrogen or alkyl of from 1 to 6 carbon atoms. Most preferably, because the products seem to have the best combination of properties, it is preferred to use as the anhydride, the compound known as maleic anhydride, i.e.,

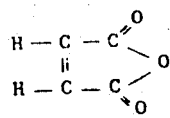

Either of the above reactions, i.e., the di-amine or the anhydride of an unsaturated dicarboxylic acid can be used alone or in combination with one or more of other members of the family, depending on the type of product desired. The molar ratio of anhydride to the diamine has been found to be important in providing products of the desired functionality and properties. It is necessary to adjust the ratio of reactants in step (a) to provide at least about 2 but not more than about 3 moles of anhydride for each mole of amine. Especially preferably, about 2 moles of anhydride will be used for each mole of amine in this step. After the condensation product, e.g., compounds II, IV and V, has been formed, more amine is added and again, it is important to provide a definite ratio of reactants. It is necessary in step (b) to provide a mixture at least about 2 moles and not more than 3 moles of condensation product (imide plus side reaction products) for each mole of amine in step (c). In this case, it is especially preferred to use about 2.5 moles of condensation product for each mole of amine.

In accordance with the process of this invention, the preparation of prepolymers of polyimides can easily be carried out by dissolving the difunctional amine and the anhydride in the inert solvent.

It is necessary first to react the diamine with at least a stoichiometric amount of the anhydride to produce the difunctional imide and any side reation products and then to add a further mole of diamine for each 2 to 3 moles of difunctional imide in the mixture. If there are any side reaction products, for the purpose of selecting the amount of amine, they will be treated as if they are difunctional imides.

Optionally, there can be added to the first reaction stage (step) (b)) a small effective amount of catalyst to promote imidization and to the second stage (step (d)) a catalyst to promote the addition of the amine to the double bond in the anhydride. Suitable, optional, catalysts for imidization are a metal salt of a monocarboxylic acid, e.g., nickel acetate; or an alkyl amine, e.g., a mono-, di- or tri-alkyl amine in which each alkyl group has from 1 to 6 carbon atoms, e.g., triethylamine. Suitable catalysts for the addition reaction are so-called "Michael - addition" catalysts and especially acidic catalysts, particularly organic acids, such as organic carboxylic acids, e.g., acetic acid.

There is no particular lower limit on the reaction temperature, in either reaction stage (b) or (d), although in most cases heating to at least 30°–35°C. is desirable and most satisfactory results are obtained at a minimum temperature of about 50°C. The maximum temperature of about 75°C. should not be exceeded. Excellent results will be obtained if the mixture is heated between about 55°and 70°C., and the reaction proceeds particularly smoothly if acetone is used as the inert solvent and the mixture is refluxed. The temperature in such a system will be about 62°C.

The reaction time for either stage varies depending on such factors as the type of reactants, the nature of the solvent, whether or not a catalyst is employed, etc., but it is sufficient to carry out the reaction until analysis of the mixture indicates that the amine groups have been substantially completely reacted. As will be seen from the flow diagram above, the amine groups become reacted at the end of each stage. In general, satisfactory results are obtained if the reaction is performed for a period of 10 minutes to 6 hours.

The prepolymer can be used in solution, for example, to impregnate webs of paper, glass cloth and the like, which can be layered and consolidated under heat and pressure to form laminates in which the macromolecular polyimide resin is the binder. On the other hand the prepolymer can be recovered from solution by any convenient means. For example, the solvent can be evaporated to leave the prepolymer as a residue Alternatively, a non-solvent for the prepolymer can be added to the solution, or vice versa, and the prepolymer precipitated.

In any case, the recovered prepolymer may be hardened by heating, e.g., at a temperature of from about 100°C. to about 350°C to produce the macromolecular polyimide, as described above. In contrast with the prior art prepolymers, it is not necessary to facilitate such a reaction with a catalyst capable of generating free radicals.

One preferred way to recover the product from an acetone reaction, in particulate form, is to cool the reaction mixture to about 20°–25°C. and to reverse precipitate into about 10 volumes of cold water, e.g., at 10°–15°C. The particulate material is then filtered, cold water washed, refiltered and dried, e.g., in a vacuum.

DESCRIPTION OF THE PREFERRED EMBODIMENTS

The advantages obtained by preparing polyimide prepolymers according to this invention are illustrated in the following examples. The examples are not to be construed as limiting the invention thereto.

EXAMPLE 1

Maleic anhydride, 41 g., is dissolved in 200 ml. of acetone containing 1-5 ml. of distilled water and the solution is heated to reflux (60°C.). Methylene dianiline, 39.5 g., is dissolved in 100 ml. of acetone and this solution is metered into the maleic anhydride solution during 40 minutes. To the mixture, as imidization catalysts there are added 0.4 g. of nickel acetate, 7.0 g. of triethylamine, and 60.0 g. of acetic anhydride. This mixture is heated at reflux (63°C.) for 2 hours. A homogeneous solution is obtained after about 20 minutes. Water, 20.8 g., is added to the mixture and allowed to react for about 30 minutes to convert the excess acetic anhydride to acetic acid. Then methylene dianiline, 15.8 g. is added to the mixture (27% solids content at this point) and the solution is heated and refluxed at 64°C. for 4 hours. The mixture is then precipitated into ten volumes of cold (10°–15°C.) water. The granular, precipitated material is agitated for 5 minutes then filtered. The material is washed with water and refiltered. It is dried at 60°C. in a vacuum.

The product is obtained in 95% overall yield based on starting raw materials. It has a melting point (by DSC) of 131°C.; it has 0.27 double bonds per 100 grams; an amine content of 1.3% and a volatile content of about 0.5%. When compounded into a formulation comprising 25% by weight of graphite — 75% by weight of resin and molded at 475°F. under pressure, the flexural strength is 12,500 psi and the flexural modulus is 818,000 psi.

EXAMPLE 2

For comparison purposes, a polyimide prepolymer is prepared according to the prior art by blending 2 moles of dry, pure bis maleimidodiphenyl methane with one mole of methylene dianiline, spreading the mixed dry ingredients on trays and heating in an oven at 160°C. The mixture melts and reacts statically to form the product. When cooled, the solid product is broken up and ground.

Product yield is 70% based on starting raw materials. It has a variable melting range (by DSC) of between 95 and 125°C.; about 0.29 double bonds per 100 g., an amine content of 0.2%; and a volatile content of 0.5%. When compounded into a formulation comprising 25% by weight of graphite — 75% by weight of resin and molded at 475°F. under pressure, the flexural strength is 9,000 psi, and the flexural modulus is 760,000 psi.

Thus the flexural properties, while high, still are substantially below those of the product prepared according to this invention (Example 1).

The graphite-polyimide composites from Examples 1 and 2 are thermally aged at 260°C. and tested (at room temperature) and the results are summarized in the Table:

Table: Thermal Aging of 25-Graphite-75-Polyimide Composite at 260°C.

| Composite | Aging time Hours | Flex. Modulus (psi) | Flex. Strength (psi) | Strength retained, % |
|---|---|---|---|---|
| Example 1 (this invention) | 0 | 818,000 | 12,500 | |
| | 500 | 789,600 | 11,700 | 94 |
| Example 2 (prior art) | 0 | 760,000 | 9,000 | |
| | 500 | 711,000 | 7,500 | 83 |

Thus, not only is the initial strength of the prepolymers of the present invention significantly higher, but also the strength properties are better retained after aging at high temperature.

Obviously, other modifications and variations of the present invention are possible in light of the above teachings.

For example, instead of acetone, there can be used methyl ethyl ketone and methyl isobutyl ketone, keeping the reaction temperature below 75°C. in either case.

Instead of methylene dianiline, i.e., 4,4'-diamino diphenyl methane, there can be used 4,4'-diamino dicyclohexylmethane; 1,4-diamino cyclohexane; 2,6-diaminopyridine; metaphenylenediamine; paraphenylenediamine; 2,2-bis(4-aminophenyl)propane; benzidine; 4,4'-diaminodiphenyl ether; 4,4'-diaminodiphenyl sulfide; 4,4'-diaminodiphenyl sulfone; bis(4-aminophenyl)diphenylsilane; bis-(4-aminophenyl)methylphosphine oxide; bis(3-aminophenyl)methylphosphine oxide; bis(4-aminophenyl)phenylphosphine oxide; bis(4-aminophenyl)phenylamine; 1,5-diaminonaphthalene; meta xylene diamine; para xylene diamine; and hexamethylenediamine.

Instead of maleic anhydride there can be used citraconic anhydride, tetrahydrophthalic anhydride and itaconic anhydride.

Because of their excellent physical, mechanical, chemical, electrical and thermal properties, the polymers produced by the process of this invention have many and varied uses. For example, they can be used in molding powder formulations, either alone or mixed with other polymers and may contain various fillers, such as wood flour, diatomaceous earth, carbon black, silica and the like, or reinforcing agents, such as graphite fiber, glass filaments and glass fibers, to make molded parts, such as spur, helical, worm or bevel gears, ratchets, bearings, cams, impact parts, gaskets, valve seats for high pressure oil and gas systems or other chemical fluids, parts requiring resistance to chemicals and the like. They can be used to prepare molded, case, calendered and extruded articles, films, coatings, threads, filaments, tapes and the like, and are useful in electrical applications, such as cable terminals, terminal blocks, backing for electrical circuits, as components of dynamoelectric machines that operate at high temperatures, and the like. Films of these materials are useful as metal or fiber liners, containers, covers, closures, electrical insulating tapes, magnetic tapes, photographic films, pipe and wire tapes, and the like. As a coating material, they can be applied as a solution or suspension to any convenient foundation where a surface possessing their excellent properties is desired. They can be used as an encapsulation material, for electrical insulation, for example, as a wire enamel, potting compound, and the like. Fibers produced from the polymers can be woven into fabrics, useful in many applications, for example, as filter cloths where high chemical and heat-resistance is desired. Their excellent electrical properties make laminates of these materials useful for electrical equipment, such as slot wedges in the armature of an electric motor, panel boards for printed circuits, electrical appliance panels, radio and television panels, small punched electrical pieces, transformer terminal boards, transformer coil spacers, and the like. The compositions may also include various fillers and modifying agents, and the like, such as dyes pigments, stabilizers, plasticizers, and the like.

It is to be understood that changes may be made in the particular embodiments of the invention in light of the above teachings, but that these will be within the full scope of the invention as defined by the appended claims.

We claim:

1. A process for the preparation of a solid polyimide prepolymer consisting essentially of
    a. dissolving a difunctional amine having the formula
    $H_2N — R — NH_2$
    where R consists of two arylene groups joined through an alkylene group of from 1 to 3 carbon atoms; and an anhydride of an aliphatically unsaturated dicarboxylic acid having the formula

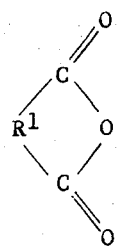

where $R^1$ is a divalent group containing up to about 30 carbon atoms and has at least one carbon-to-carbon double bond in an inert solvent to form a solution containing from about 2 to about 3 moles of anhydride for each mole of amine;
    b. heating said solution at a temperature not in excess of about 75°C to form a condensation product in which the amine groups have been substantially completely reacted;
    c. adding said difunctional amine as above to the reaction mixture from step (b) to provide a solution containing from about 2 to about 3 moles of condensation product for each mole of amine; and
    d. heating the solution of step (c) at a temperature not in excess of about 75°C until formation of said prepolymer is substantially complete.

2. The process as defined in claim 1 wherein the solution in step (b) includes a dehydrating agent for imidization and after condensation is complete water is added to react with excess agent before step (c) is carried out.

3. The process as defined in claim 2 wherein said dehydrating agent is acetic anhydride and conversion of excess acetic anhydride to acetic acid with water provides a catalyst for the reaction in step (d).

4. The process as defined in claim 1 wherein said inert solvent is a (lower)aliphatic ketone.

5. The process as defined in claim 1 wherein said solvent is acetone and heating is carried out at the refluxing temperature of said solution.

6. The process as defined in claim 1 wherein, in said amine, R is

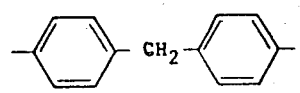

and, in said anhydride, $R^1$ is
    —HC = CH —

7. The process as defined in claim 1 including the step of recovering said prepolymer from solution.

8. The process as defined in claim 3 including the step of recovering said prepolymer from solution.

9. The process as defined in claim 8 wherein said solvent is water miscible and said prepolymer is recovered from solution by adding said solution to water until precipitation of said prepolymer is substantially complete and separating the precipitated prepolymer.

10. The process as defined in claim 9 including the step of heating said prepolymer until conversion of said prepolymer to a macromolecular polyimide is substantially complete.

11. The process as defined in claim 10 wherein said prepolymer is heated at a temperature of from about 100°C. to about 350°C.

12. A process for the preparation of a solid prepolymer which consists essentially of
    a. dissolving methylenedianiline and an anhydride of an aliphatically unsaturated dicarboxylic acid having the formula

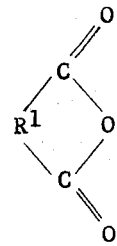

wherein $R^1$ is a divalent group of up to about 30 carbon atoms and has at least one carbon-to-carbon double bond in an inert solvent to form a solution containing from about 2 to about 3 moles of anhydride for each mole of amine;
    b. heating said solution at a temperature not in excess of about 75°C to form a condensation product in which the amine groups have been substantially completely reacted;
    c. adding methylenedianiline to the reaction mixture from step (b) to provide a solution containing from about 2 to about 3 moles of condensation product for each mole of amine; and
    d. heating the solution of step (c) at a temperature not in excess of about 75°C until formation of said prepolymer is substantially complete.

* * * * *